United States Patent
Van Briesen

(10) Patent No.: US 10,220,559 B2
(45) Date of Patent: Mar. 5, 2019

(54) METHOD AND APPARATUS FOR MAKING FORM-IN-PLACE GASKETS

(71) Applicant: Axel Werner Van Briesen, Pittsburgh, PA (US)

(72) Inventor: Axel Werner Van Briesen, Pittsburgh, PA (US)

( * ) Notice: Subject to any disclaimer, the term of this patent is extended or adjusted under 35 U.S.C. 154(b) by 289 days.

(21) Appl. No.: 15/158,466

(22) Filed: May 18, 2016

(65) Prior Publication Data
US 2017/0334118 A1    Nov. 23, 2017

(51) Int. Cl.
| | |
|---|---|
| B29C 47/08 | (2006.01) |
| B29C 63/22 | (2006.01) |
| B29C 47/00 | (2006.01) |
| B29L 31/26 | (2006.01) |
| B29C 49/00 | (2006.01) |

(52) U.S. Cl.
CPC ...... *B29C 47/0808* (2013.01); *B29C 47/0054* (2013.01); *B29C 49/0031* (2013.01); *B29L 2031/265* (2013.01)

(58) Field of Classification Search
CPC ............ B29C 47/0808; B29C 47/0054; B29C 49/0031; B29L 2031/265
See application file for complete search history.

(56) References Cited

U.S. PATENT DOCUMENTS

| | | | | |
|---|---|---|---|---|
| 3,315,307 A | * | 4/1967 | Hurd | B29C 47/0808 425/168 |
| 4,101,617 A | * | 7/1978 | Friederich | B29C 45/1704 264/155 |
| 4,753,824 A | | 6/1988 | Toda et al. | |
| 4,907,957 A | * | 3/1990 | Nakagawa | B29C 47/0023 215/12.2 |
| 5,089,190 A | | 2/1992 | Trevathan et al. | |
| 5,273,417 A | * | 12/1993 | Nelson | B29C 45/1735 264/572 |
| 5,336,349 A | | 8/1994 | Cornils et al. | |
| 5,378,138 A | * | 1/1995 | Onuma | B29C 45/2806 264/102 |
| 5,914,138 A | * | 6/1999 | Swenson | B29C 45/1607 425/130 |
| 6,000,925 A | * | 12/1999 | Daniels | B29C 45/1704 264/572 |
| 2007/0096358 A1 | * | 5/2007 | Pelcz | A21C 11/16 264/209.8 |
| 2009/0096129 A1 | * | 4/2009 | Hirota | B29B 11/12 264/165 |
| 2012/0121750 A1 | * | 5/2012 | Hegler | B29C 47/0023 425/256 |
| 2012/0187588 A1 | * | 7/2012 | Takagi | B29C 45/1704 264/1.1 |

(Continued)

*Primary Examiner* — Nahida Sultana
(74) *Attorney, Agent, or Firm* — Hutchison Law, LLC; Linda Sigillito Hutchison

(57) ABSTRACT

An apparatus for making hollow, form-in-place gaskets is disclosed. The apparatus includes a nozzle and a forming surface. The nozzle comprises an extrusion orifice for extruding a gasket onto the forming surface. The apparatus further includes means for the nozzle to separately communicate with an air supply and a liquid elastomer supply. The nozzle configuration maintains the separation between the supplied air and the supplied liquid elastomer proximate to the extrusion orifice.

5 Claims, 7 Drawing Sheets

(56) References Cited

U.S. PATENT DOCUMENTS

| | | | |
|---|---|---|---|
| 2014/0077406 A1* | 3/2014 | Okamoto | B29C 45/1635 264/50 |
| 2015/0079221 A1* | 3/2015 | Schad | B29C 45/54 425/557 |
| 2017/0087759 A1* | 3/2017 | Huang | B29C 47/0023 |

* cited by examiner

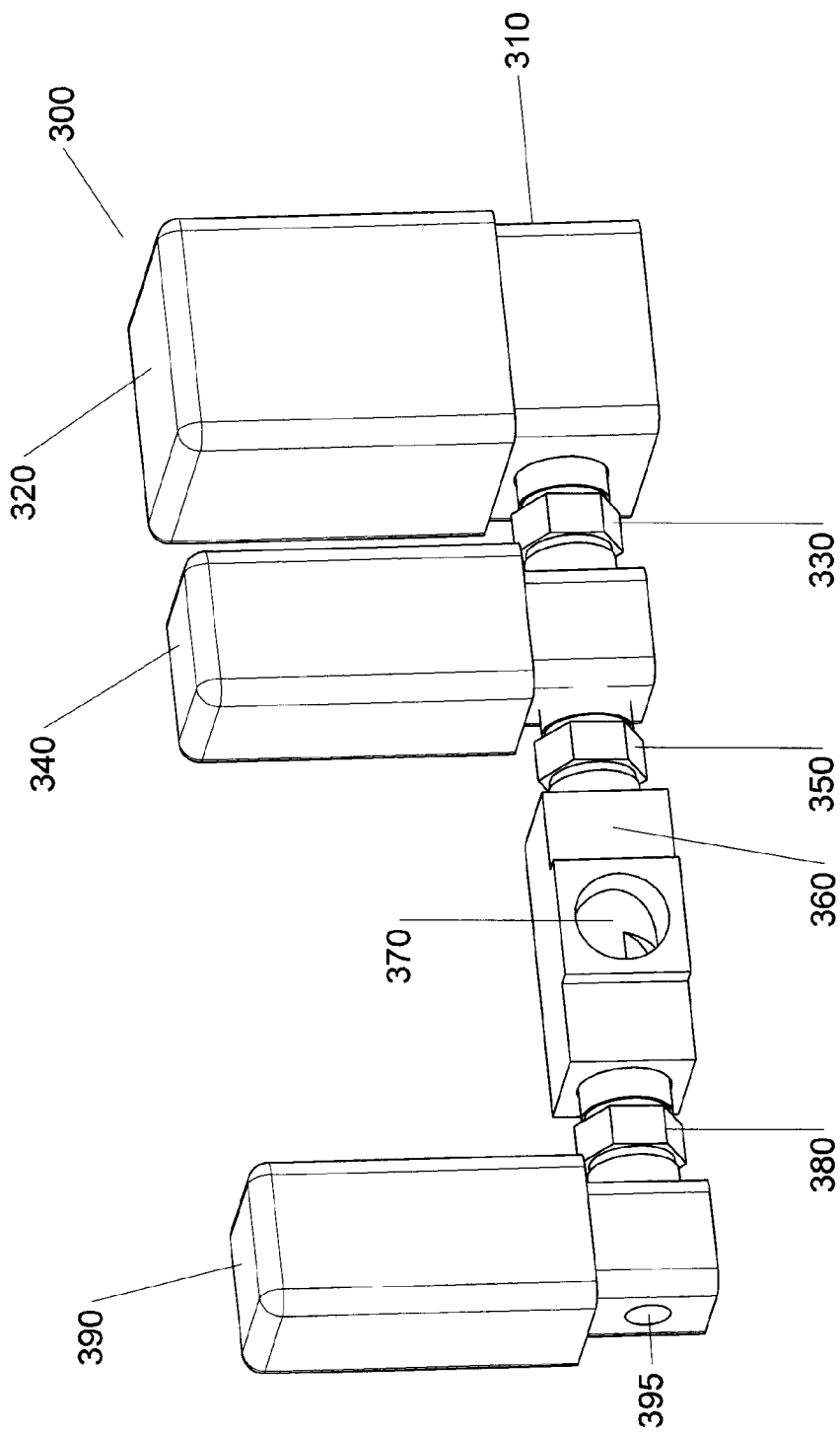

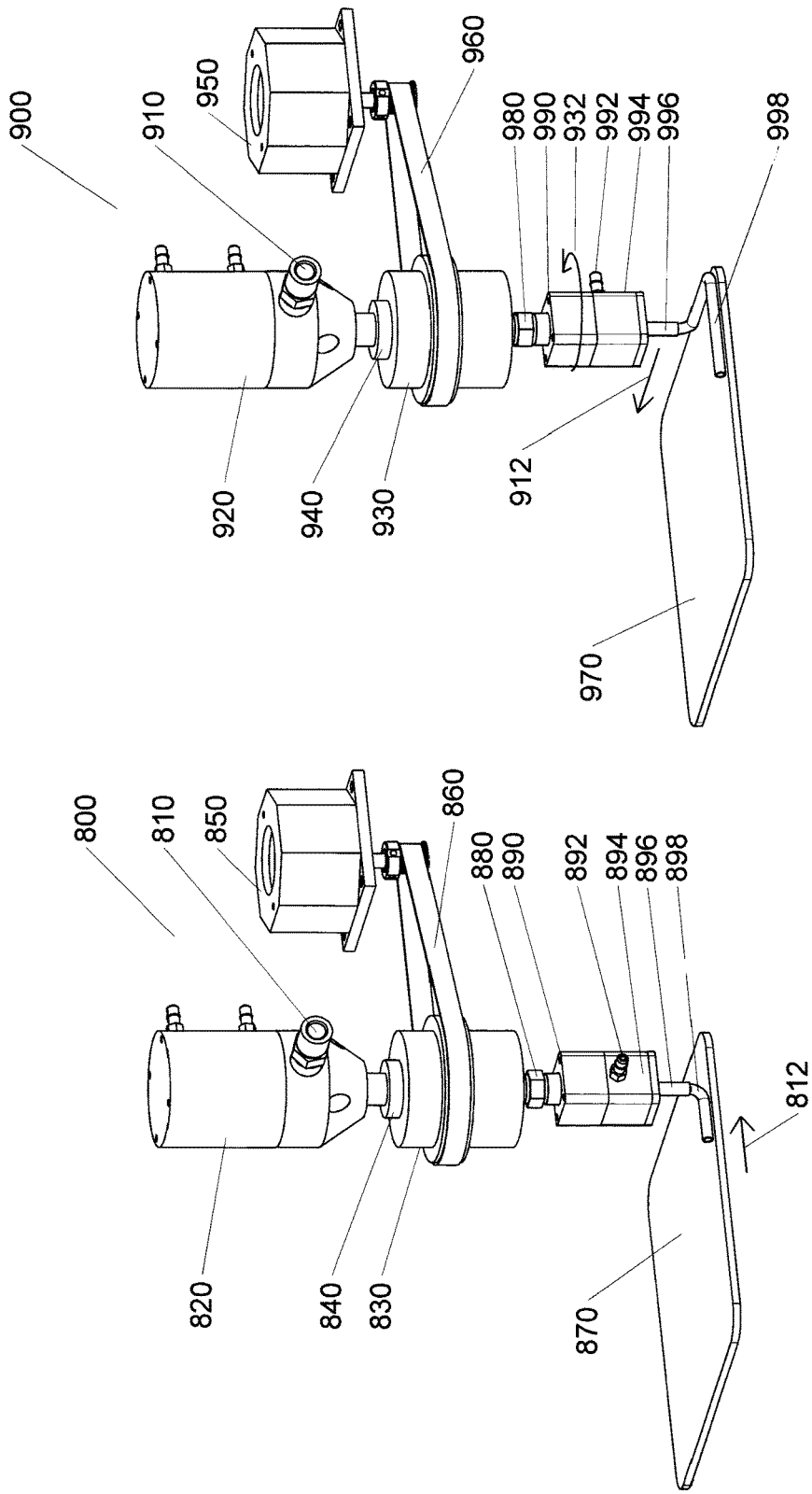

METHOD AND APPARATUS FOR MAKING FORM-IN-PLACE GASKETS

BACKGROUND OF THE INVENTION

Gaskets form a seal that forgives an imperfect alignment between mating surfaces. Specifically, gaskets fill a space between the mating surfaces. In this way, gaskets may be used to prevent liquid, dust, or gas from entering a protected space between the two mating surfaces. Gaskets may be formed independent of the surfaces, and attached as hardened material to the surfaces. Alternatively, gaskets may be formed, or dispensed, directly onto one of the mating surfaces, and cured on the mating surface. In this case, a second mating surface compresses to the first mating surface-gasket combination to form the seal. This direct dispensing, or "Form-In-Place" gasket manufacturing, addresses labor and inventory concerns associated with forming gaskets independent of actual use. Further, "Form-in-Place" gasket shapes support a variety of gasket uses. Accordingly, gaskets may be formed-in-place, and integral to use, to support business needs.

SUMMARY OF THE PRESENT INVENTION

Various exemplary embodiments of the present disclosure may demonstrate one or more of the invention features. Other features and advantages of this invention will become apparent from the following detailed description of the presently preferred embodiment of the invention, taken in conjunction with the accompanying drawings.

In accordance with an exemplary embodiment, an apparatus for making hollow, form-in-place gaskets includes a nozzle and a forming surface. The nozzle comprises an extrusion orifice. The apparatus further includes an air supply means and a liquid elastomer supply means. The nozzle communicates with the air supply means and the liquid elastomer supply means. Specifically, the nozzle maintains a separation of supplied air and supplied liquid elastomer proximate to the extrusion orifice.

In accordance with a further exemplary embodiment, a method of making hollow, form-in-place gaskets includes supplying liquid elastomer compound to an extruding means. The method further includes supplying low pressure air to the extruding means and substantially simultaneously extruding the liquid elastomer compound and the low pressure air through the extruding means. The method even further includes forming a hollow, liquid elastomer bead and dispensing the bead onto a forming surface.

It is to be understood that both the foregoing general description and the following detailed description are exemplary and explanatory only and are not restrictive of the present disclosure or claims.

BRIEF DESCRIPTION OF THE DRAWINGS

The drawings referenced herein are incorporated in and form part of the specification. The drawings illustrate one or more exemplary embodiments of the present disclosure and together with the description serve to explain various principles and operations. Implications that the drawings illustrate all embodiments of the invention are not to be made.

FIG. 3 illustrates a perspective view of an exemplary air regulation system.

FIG. 8 illustrates a perspective view of an embodiment of a rotator of the present disclosure in a first position.

FIG. 9 illustrates a perspective view of an embodiment of a rotator of the present disclosure in a second position.

DETAILED DESCRIPTION OF THE INVENTION

Figure 1:
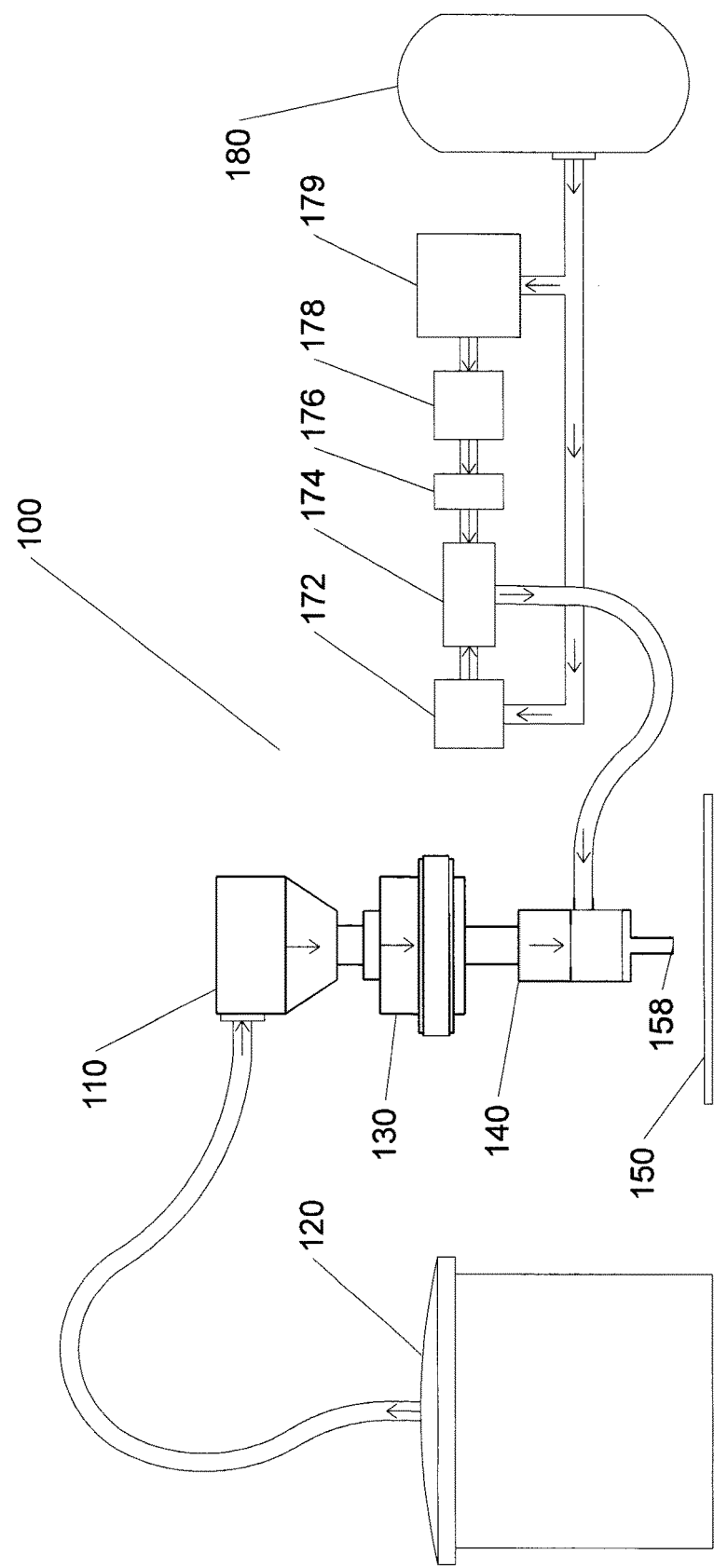
FIG. 1 illustrates a front view of an exemplary embodiment of an apparatus for making a form-in-place hollow gasket in accordance with the present disclosure.

Reference will now be made in detail to various exemplary embodiments of the present disclosure, examples of which are illustrated in the accompanying drawings.

It will be readily understood that the components of the present invention, as generally described and illustrated in the figures herein, may be arranged and designed in a wide variety of different configurations. Thus, the following detailed description of the embodiments of the apparatus and method of the present invention, as presented in the figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearance of the phrases "a select embodiment," "in one embodiment," or "in an embodiment" in various places throughout this specification are not necessarily referring to the same embodiment.

Features, structure, or characteristics described herein may be combined in any suitable manner in one or more embodiments. One skilled in the relevant art will recognize, however, that the invention may be practiced without one or more of the specific details, or with other methods, components, or materials. In other instances, well-known materials or processes are not shown or described in detail to avoid obscuring aspects of the invention. The following description, which shows by way of illustration the specific embodiment in which the invention may be practiced, is intended only by way of example. That is, the following description simply illustrates certain selected embodiments of apparatus and methods that are consistent with the invention as claimed herein. It is to be understood that other embodiments may be utilized because structural changes may be made without departing from the scope of the present invention.

"Form-In-Place" gasket manufacturing directly dispenses gaskets onto a mating surface, where the gasket cures. A second mating surface compresses to the first mating surface-gasket combination to create the seal. Gaskets may be formed in place as polymer beads. The polymer bead deposited on a mating surface protects a final shape of an area surrounded by the gasket seal. In non-limiting exemplary embodiments of the present disclosure, polymer materials may be thixotropic. In some embodiments, for example, the polymer may comprise urethane acrylates or silicone. Those of ordinary skill in the art will appreciate that gaskets comprising extruded, or dispensed silicone, have long lasting temperature resistant properties. Silicone gaskets are an affordable option for high or low temperature application. The present e contemplates all materials supporting form-in-place gasket manufacturing. The examples of materials provided herein are for exemplary purposes, only, and are not meant to be limiting. Accordingly, gaskets may be formed in place on a mating surface.

To enhance the uses of form-in-place gaskets, gaskets may comprise hollow shapes. Those of ordinary skill in the art will appreciate that form-in-place hollow gaskets may provide quality attributes unrealized by solid gaskets, such as an increase in compressibility. In an example, a hollow gasket comprising holes at both ends may act as a fluid channel. In another example, a hollow interior may act to insulate wires inserted into a hollow gasket. These examples are non-limiting and the present disclosure contemplates a variety of formed-in-place, hollow gaskets. Accordingly, ultimate gasket use may influence process variable or apparatus configuration for making a form-in-place hollow gasket.

FIG. 1 illustrates a front view of an exemplary embodiment of an apparatus for making a form-in-place hollow gasket in accordance with the present disclosure (100). In an exemplary embodiment of the present disclosure, for example, material may flow from a material supply tank (120) to a nozzle (140). In an exemplary embodiment, for example, a material supply control valve (110) may control material flow from the material supply tank (120) to a rotator (130). In further exemplary embodiments, the material supply tank (120) may supply liquid elastomer, such as silicone, to the rotator (130). As will be described herein below in various exemplary embodiments of the present disclosure, the rotator (130) may operationally communicate with the nozzle (140) and turn the nozzle following a desired shape on a forming surface (150). In a non-limiting exemplary embodiment of the present disclosure, the nozzle (140) may comprise an extrusion orifice (158) for dispensing hollow gaskets onto the forming surface (150). Accordingly, a material control valve (110) controls the flow of material from a material supply tank (120) to a nozzle (140), while a rotator (130) controls movement of the nozzle (140) following a desired shape on the forming surface (150).

In an exemplary embodiment of the present disclosure, for example, pressurized air may flow from an air supply (180) to a nozzle (140). In another embodiment, for example, a low pressure supply valve (178) may control the flow of low pressure air from the air supply (180), and through an inner channel connection means (174) to the nozzle (140). In a further exemplary embodiment, a restrictor orifice (176) may generate back pressure to a regulator (179) to address pulsations, which may occur at an extrusion orifice (158). In this way, the restrictor orifice (176), for example, may address a flexing of a hollow, extruded shape. Accordingly, an inner channel connection means (174) may provide low-pressure air flow from the air supply (180) to the nozzle (140).

In another exemplary embodiment of the present disclosure, for example, a high pressure supply valve (172) may control high pressure air to the nozzle (140). In a non-limiting exemplary embodiment of the present disclosure, the high pressure air may support cleaning the nozzle (140), including the extrusion orifice (158), once a hollow gasket detaches from the nozzle (140). The high pressure supply valve (172) may control the flow of high pressure air from the air supply (180), and through the inner channel connection means (174) to the nozzle (140). Accordingly, an inner channel connection means (174) may provide high-pressure air flow from the air supply (180) to the nozzle (140).

Those of ordinary skill in the art would understand, however, that the present disclosure is not limited to the embodiments illustrated in FIG. 1. That is, the present disclosure contemplates various apparatus configurations, including various exemplary embodiments for providing, for example, liquid elastomer and pressurized air to the nozzle (140) for dispensing hollow gaskets onto the forming surface (150).

To achieve the gasket sealing use and quality attributes necessary to support business needs, various exemplary embodiments of the present disclosure contemplate forming a hollow gasket by extruding a pressurized fluid substantially collinearly or concentrically with liquid elastomer through an extrusion orifice and onto a forming surface. As used herein, the term "forming surface," "mating surface," "substrate," and any variations thereof refer to any type of mating surface. In various exemplary embodiments of the present disclosure, a hole is coaxially introduced into a center of the gasket through an inner channel and outer channel nozzle head configuration. In alternate embodiments, for example, the nozzle head may comprise alternate outer channel or inner channel shapes, either or both of which may not have an easily identifiable substantial center point, such as a triangular shape. Various exemplary embodiments of the present disclosure contemplate that the inner and outer channels may function to independently provide air and liquid elastomer proximate to the extrusion orifice, respectively. In further non-limiting exemplary embodiments, the inner and outer channels may provide air and liquid elastomer, respectively, to the extrusion orifice in substantial collinear or concentric formation. Accordingly, regulated pressurized air may be supplied to the nozzle head, such that liquid elastomer and the air may be independently, or separately, extruded from the extrusion orifice onto the forming surface.

Figure 2:
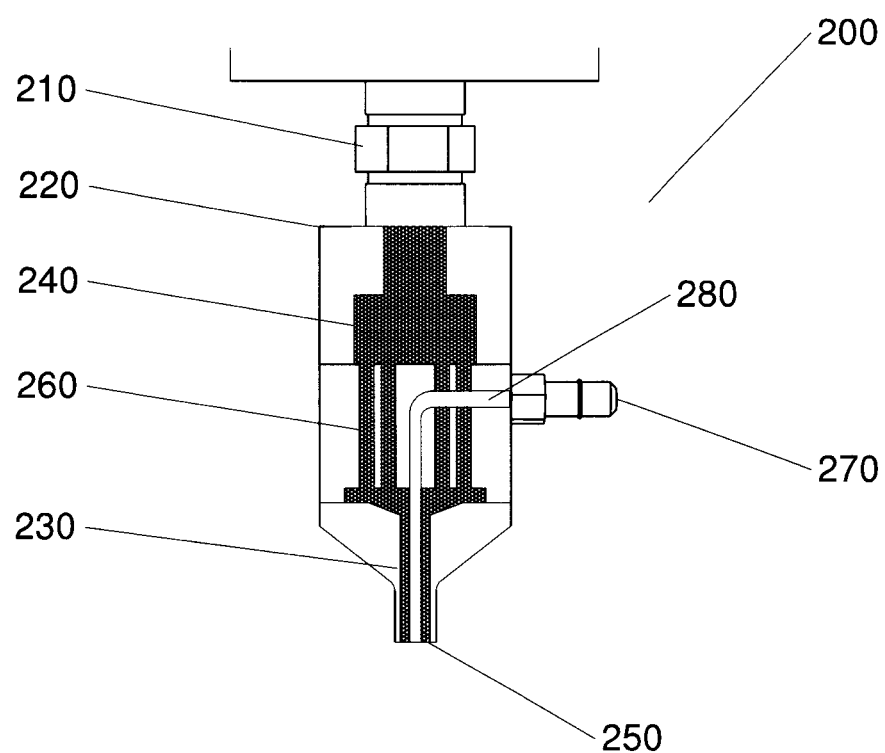
FIG. 2 illustrates a cross-sectional view of an exemplary nozzle.

FIG. 2 illustrates a cross-sectional view of a nozzle (200). In an exemplary embodiment, a connection means (210) may connect a nozzle head (220) to a material supply means (not shown). In an exemplary embodiment, for example, the material supplied may comprise liquid silicone, or other liquid elastomer. The nozzle head (220) may comprise an outer channel (230). Various exemplary embodiments of the present disclosure may contemplate the outer channel (230) comprising, for example, a reservoir (240) for capturing material flow from a material supply means (not shown), and for moving material to an extrusion orifice (250). In an exemplary embodiment, for example, the material may flow from the reservoir (240) through a reservoir channel (260) to the outer channel (230) at the extrusion orifice (250). In an alternate exemplary embodiment, a plurality of reservoir channels (260) comprises a ring and form the outer channel (230). The configuration of the outer channel, as described herein, is not meant to limit the present disclosure. Accordingly, liquid elastomer material may flow from a material supply means to the extrusion orifice (250) of the nozzle head (220) via the outer channel (230).

In a further exemplary embodiment, for example, a regulated air pressure connection means (270) may communicate with the nozzle head (220) to supply pressurized air to the extrusion orifice (250). In an exemplary embodiment of the present disclosure, the regulated air pressure connection means (270) operationally connects a pressurized air source (not shown) to an inner channel (280) of the nozzle head (220). In an exemplary embodiment of the present disclosure, the positioning of the inner channel (280) and the outer channel (230) within the nozzle head (220) may maintain a separation between the supplied pressurized air and the supplied liquid elastomer. Those of ordinary skill in the art would understand, however, that the location of the regulated air pressure connection means (270) in view of the nozzle head (220) is exemplary only and that the regulated air pressure connection means (270) in accordance with the present disclosure may have alternate positions. Accordingly, pressurized air may flow from a regulated air pressure means (not shown) to the extrusion orifice (250) of the nozzle head (220) via the inner channel (280).

In non-limiting exemplary embodiments of the present disclosure, the outer channel (230) and the inner channel (280) may be substantially collinear or concentric at the extrusion orifice (250). In a further exemplary embodiment, the outer channel (230) and the inner channel (280) may be substantially coincident, or in planar communication, at the extrusion orifice (250). That is, the outer channel (230) and the inner channel (280) may end, or have exits, together at the extrusion orifice (250). In an exemplary embodiment of the present disclosure, having the outer channel (230) and the inner channel (280) substantially coincident at the extrusion orifice (250) may support substantially simultaneous extrusion of, for example, liquid elastomer and pressurized air at the extrusion orifice (250). In alternative embodiments, the outer channel (230) and the inner channel (280) may be substantially coincident proximate to, preceding, or subsequent to the extrusion orifice (250). The exemplary embodiments of a nozzle configuration provided herein in the present disclosure are non-limiting, and the present disclosure contemplates a variety of nozzle head shapes and configurations. Accordingly, a nozzle head (220) communicates with a liquid elastomer supply means and a regulated air supply means to supply liquid elastomer to the outer channel (230) and pressurized air to the inner channel (270) of the nozzle head (220) proximate to the extrusion orifice.

In various exemplary embodiments of the present invention, pressurized air is presented through the inner channel to the substantial center of the hollow gasket to fill the hole created by the outer channel. With that in mind, for example, the pressurized air may maintain the structural integrity of the gasket walls at the extrusion orifice. In various further embodiments, for example, the gasket may be slightly inflated, when compared to the gasket size created at the extrusion orifice. As a result, the walls of the gasket may become thinner, the gasket may become softer, and the height of the gasket, also known as the first point of contact, may increase. Various exemplary embodiments of the present invention contemplate that the thinning of the gasket walls may create additional tension on the gasket surface. In doing so, for example, the pressurized air at the extrusion orifice may support the hollow gasket form. Accordingly, regulated pressurized air may be supplied through the inner channel to the extrusion orifice to maintain quality attributes of the hollow gasket extruded onto a forming surface.

In an exemplary embodiment, the air is supplied to the inner channel at a very low pressure. In another exemplary embodiment, the air supplied is low pressurized air. In a further exemplary embodiment, the air pressure supplied to the inner nozzle is pressurized to support a desired surface tension of the liquid polymer forming the hollow gasket structure. Those of ordinary skill in the art will understand, however, that these pressures are provided for exemplary purposes, and that pressures in accordance with the present disclosure may be greater or less than the exemplary pressures provided herein. Accordingly, air supplied to the inner channel of the nozzle is regulated to accommodate air pressure requirements supporting a desired configuration of the hollow gasket.

FIG. 3 illustrates a perspective view of an exemplary air regulation system (300). The air regulation system (300) controls the pressure of air provided to the inner channel discussed herein above in FIG. 2. A low pressure air supply inlet (310) communicates with a first air supply (not shown) to provide air to the air regulation system (300). The air may be supplied at a desired pressure to the inlet (310). In an exemplary embodiment, the provided air is processed through a regulator (320). In an embodiment, the regulator (320) may be an electronic pressure regulator. In that case, pressure sensors may be built into the electronic pressure regulators. To achieve the desired air pressure, various exemplary embodiments of the present disclosure contemplate different configurations of the regulator (320). To that end, those of ordinary skill in the art will understand that an electronic pressure regulator is described for exemplary purposes, and is not meant to be limiting. A connection means (330) connects the regulator (320) to a first valve (340). In an embodiment, the first valve (340) may be a process solenoid. In an exemplary embodiment, which is not meant to be limiting, the first valve (340) may connect to an inner channel connection means (360) through a second connection means (350). In this way, the exemplary process solenoid may control low pressure air provided to the center of the forming gasket, as the gasket may form at the extrusion orifice. Accordingly, air provided through an air supply inlet (310) may be pressurized, and the air flow to the inner channel may be controlled.

As described herein above, in exemplary embodiments contemplated by the current disclosure, the second connection (350) may connect the first valve (340) to an inner channel connection means (360). In an exemplary embodiment, which is not meant to be limiting, the inner channel connection means (360) may comprise a T-junction, comprising an inner channel connector (370). In a further embodiment, the inner channel connector (370) communicates with an inner channel, as described herein in FIG. 2. Accordingly, an inner channel connection means (360) connects the first valve (340) to the inner channel of the nozzle to provide pressurized air to the inner channel of the nozzle.

As described herein above, in an exemplary embodiment, the inner channel connection means (360) comprises a T-junction. For example, in various exemplary embodiments of the present disclosure, the T-junction configuration may allow the air regulation system (300) to supply, at least, a plurality of air pressures to the inner channel of the nozzle. In exemplary embodiments described herein above, the T-junction may supply low pressure air to the inner channel of the nozzle to support forming a hollow cavity in gasket. In a further exemplary embodiment, the T-junction may additionally supply high pressure air to the inner channel of the nozzle to clean the nozzle, also known as a tip blow off. Those of ordinary skill in the art will understand, however, that the T-junction configuration is exemplary only and that providing low and high air pressure to the inner channel of the nozzle in accordance with the present disclosure may have various configurations. Accordingly, an inner channel connection means (360) may provide both low and high pressure air to the inner channel of the nozzle.

Extruded material may clog the extrusion orifice once the gasket is formed and detached from the nozzle. In an exemplary embodiment, not meant to limit the present disclosure, the inclusion of a high pressure source allows for unblocking at the finish of the gasket to clean the inflating source, also known as the extrusion orifice. In an embodiment, for example, the high pressure air supply has an approximate air pressure at about 80 psi. In an exemplary embodiment, a third connection means (380) may connect the inner channel connection means (360) to a high air pressure supply inlet (395). In an exemplary embodiment, for example, the high air pressure supply inlet (395) may communicate with a second valve (390). In a non-limiting exemplary embodiment, the second valve (390) may be a process solenoid. In an exemplary embodiment, for example, the unblocking may occur once the gasket has been completed and prior to the formation of another gasket. In various embodiments, for example, the first valve (340) may close and the second valve (390) may open to allow high pressure air to flow to the inner channel of the nozzle for cleaning. Accordingly, the second valve (390) may control air pressure to the inner channel of the nozzle for cleaning.

The exemplary regulator (320) of the present disclosure described in examples herein above may induce pulsations at the extrusion orifice before or after extrusion of the hollow gasket onto the forming surface. In some cases, turbulence, like pulsations, may ultimately collapse the extruded hollow gasket. A restrictor may address this turbulence. In an exemplary embodiment, for example, a restrictor (not shown) may be provided in communication with the pressure regulator (320). In an embodiment not meant to be limiting, the restrictor may control air flow between the low pressure air supply inlet (310) and the extrusion orifice. In this exemplary embodiment, a resulting backpressure from the extrusion orifice may mitigate a tendency of the regulator (320), such as an electronic pressure regulator, to induce pulsation. Accordingly, an air regulation system (300) may include a restrictor to address, for example, expansion and contraction, or pulsation, induced on a hollow gasket at an extrusion orifice by the regulator (320) during the formation of the gasket.

In an exemplary embodiment, for example, a restrictor (not shown) may be embedded within the second connection means (350), which, as discussed herein above, may connect the first valve (340) to the inner channel connection means (360). In a further exemplary embodiment, the restrictor (not shown) may comprise a restrictor orifice embedded in the second connection means (350). Accordingly, a restrictor in communication with the first valve (340) controlling low pressure air flow to the inner channel of the nozzle provides a means to address pulsations induced on the hollow gasket before or after extrusion from the extrusion orifice onto a forming surface.

Form-in-place gasket manufacturing may consider gasket quality variables, such as shape, compressibility, and height. In various embodiments of the present disclosure, a form-in-place hollow gasket comprises a tubular, oval, or triangular shape, with a hollow interior, or cavity, surrounded by an elastomer exterior. A nozzle may be configured to represent the desired hollow gasket shape. Further, in an exemplary embodiment, the nozzle may be configured to support different configurations relative to the substrate, or forming surface. Those of ordinary skill in the art will understand, however, that the present disclosure is not limited to such embodiments, but contemplate various hollow gasket shapes and dimensions supporting a wide variety of hollow gasket applications. Accordingly, quality variables may influence process variables or apparatus configuration for making a form-in-place hollow gasket.

Figure 4:
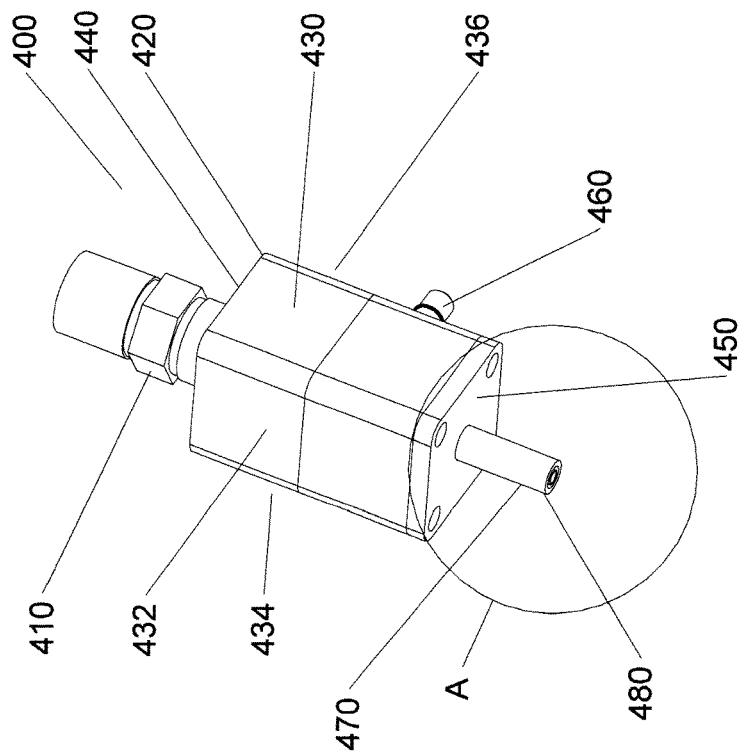
FIG. 4 illustrates a perspective view of an orthogonal extruding nozzle.

In various exemplary embodiments of the present disclosure, for example, the nozzle may extrude a tubular, hollow gasket orthogonal to the forming surface. FIG. 4 illustrates a perspective view of an orthogonal extruding nozzle (400). In an exemplary embodiment, a connection means (410) may connect a nozzle head (420) to an elastomer supply means (not shown). In an exemplary embodiment, for example, the nozzle head (420) may comprise a first side (430), a second side (432), a third side (434), a fourth side (436), a top side (440) and a bottom side (450). In a further embodiment, for example, the first side (430) may be parallel and planar to the third side (434), and perpendicular and planar to the second and fourth sides, (432) and (436), respectively. Similarly, the second side (432) may be parallel and planar to the fourth side (436), and perpendicular and planar to the first and third sides (430) and (434), respectively. Further, in an exemplary embodiment, the top side (440) may be parallel and planar to the bottom side (450). In a further exemplary embodiment, for example, a regulated air pressure connection means (460) may communicate with the fourth side (436). Those of ordinary skill in the art would understand, however, that the location of the regulated air pressure connection means (460) in view of the nozzle head (420) is exemplary only, and that the regulated air pressure connection means (460) in accordance with the present disclosure may have alternate positions. These examples of a nozzle head configuration are non-limiting and the present disclosure contemplates a variety of nozzle head shapes and configurations. Accordingly, a nozzle head (420) communicates with a liquid elastomer supply means and a regulated air supply means.

The nozzle head (420) may process the liquid elastomer and pressurized air, as described herein above, to an orifice arm (470). In an exemplary embodiment, for example, the orifice arm (470) may communicate with the bottom side (450), extending outward from the bottom side (450). In an exemplary embodiment, for example, the orifice arm (470) may comprise an extrusion orifice (480). Liquid elastomer and pressurized air move to the extrusion orifice (480) in the outer channel and inner channel, respectively, as described herein above, through the nozzle head (420). In an exemplary embodiment of the present disclosure, the nozzle head may extrude the liquid elastomer and pressurized air substantially collinearly or concentrically through the extrusion orifice (480). Accordingly, an orthogonal extruding nozzle (400) moves liquid elastomer and pressurized air through an orifice arm (480) and extrudes the liquid elastomer and pressurized air through an extrusion orifice (480) and onto a forming surface.

Figure 5:
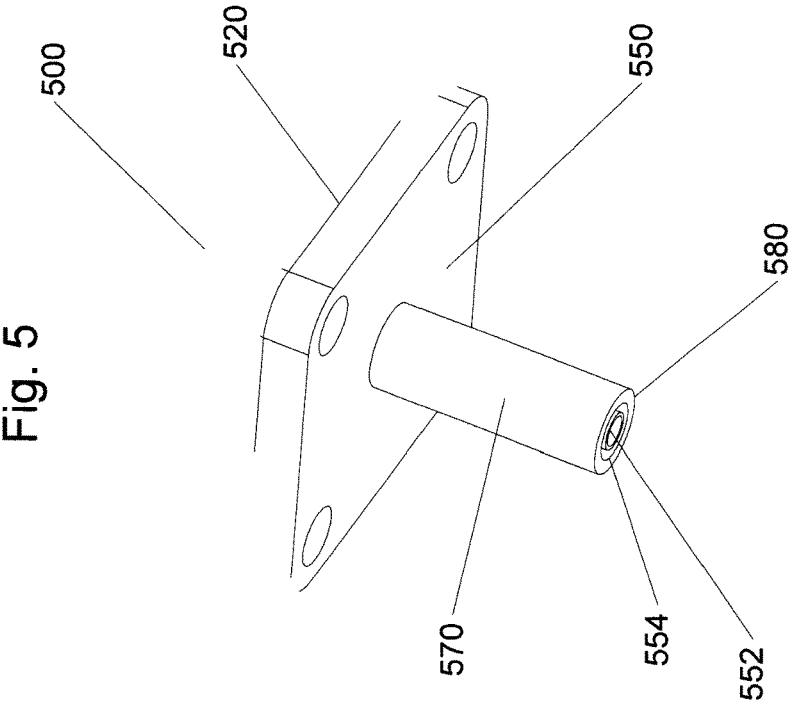
FIG. 5 illustrates a bottom view of an orthogonal extruding nozzle.

FIG. 5 illustrates a detailed drawing of the "A" portion of FIG. 4, that is, a bottom view of an orthogonal extruding nozzle (500). As described herein above, and in exemplary embodiments of the present invention, a nozzle head (520) may comprise an orifice arm (570). In further embodiments, for example, the orifice arm (570) may communicate with a bottom side (550) of the nozzle head (520). In an exemplary embodiment, for example, the orifice arm (570) may comprise an extrusion orifice (580), which may comprise an inner channel (552) and an outer channel (554). Various embodiments of the present disclosure contemplate the inner channel (552) in substantially collinear or concentric communication with the outer channel (554). In further exemplary embodiments, the inner channel (552) and the outer channel (554) may be substantially coincident, that is, in planar communication, at the extrusion orifice (570). In alternate exemplary embodiments, the inner channel (552) and outer channel (554) may be coincident proximate to the extrusion orifice (570). Accordingly, the nozzle head configuration may support dispensing hollow gaskets orthogonal to the forming surface.

Figure 6:
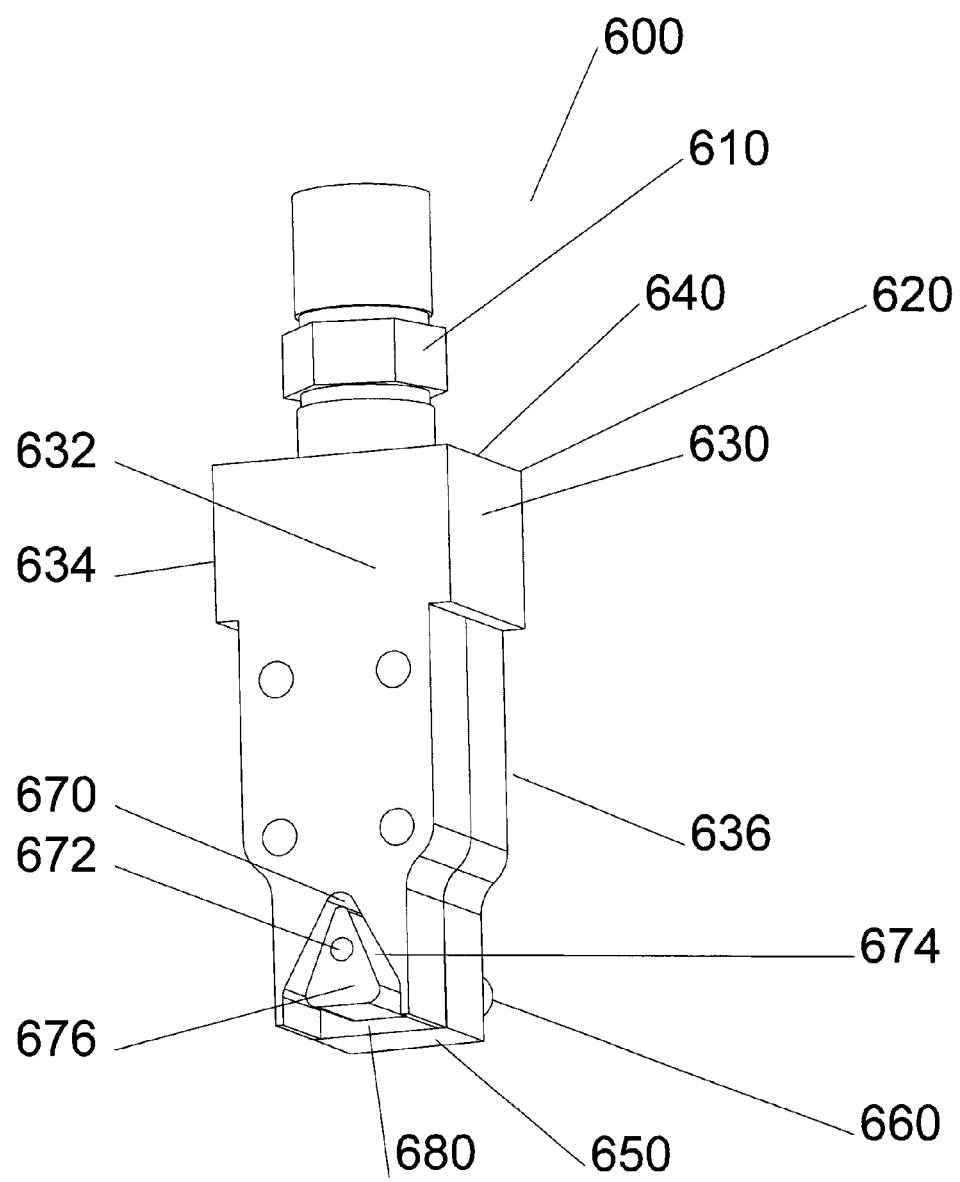
FIG. 6 illustrates a perspective view of a parallel extruding nozzle.

In various exemplary embodiments of the present disclosure, for example, the nozzle may extrude a hollow gasket parallel to the forming surface. FIG. 6 illustrates a perspective view of a parallel extruding nozzle (600). In an exemplary embodiment, a connection means (610) connects a nozzle head (620) to an elastomer supply means (not shown). In an exemplary embodiment, for example, the nozzle head (620) may comprise a first side (630), a second side (632), a third side (634), a fourth side (636), a top side (640) and a bottom side (650). In a further embodiment, for example, the first side (630) may be parallel and planar to the third side (634), and perpendicular and planar to the second and fourth sides, (632) and (636), respectively. Similarly, the second side (632) may be parallel and planar to the fourth side (636), and perpendicular and planar to the first and third sides (630) and (634), respectively. Further, in an exemplary embodiment, the top side (640) may be parallel and planar to the bottom side (650). In a further exemplary embodiment, for example, a regulated air pressure connection means (660) may communicate with the fourth side (636). Those of ordinary skill in the art would understand, however, that the location of the regulated air pressure connection means (660) in view of the nozzle head (620) is exemplary only and that the regulated air pressure connection means (660) in accordance with the present disclosure may have alternate positions. These examples of a nozzle head configuration are non-limiting and the present disclosure contemplates a variety of nozzle head shapes and configurations. Accordingly, a nozzle head (620) communicates with a liquid elastomer supply means and a regulated air supply means.

In an exemplary embodiment, an extrusion orifice (670) comprises an inner channel (672) and an outer channel (674). In an exemplary embodiment, not meant to limit the present disclosure, for example, the extrusion orifice (670) may further comprise an extrusion anvil (676) and an opening to a forming surface (680). As described herein above, various embodiments of the present invention contemplate the inner channel (672) supplying regulated air to the extrusion orifice (670) and the outer channel (674) supplying liquid elastomer to the extrusion orifice (670). In an exemplary embodiment of the present invention, for example, the extrusion anvil (676) may comprise a triangular shape. In this respect, for example, the nozzle head (620) may extrude a triangular-shaped, or other possible shaped, hollow gasket, parallel to a forming surface. Those of ordinary skill in the art would understand, however, that the shape of the anvil and the resulting shape of the hollow gasket are exemplary only, and that anvils and gaskets in accordance with the present disclosure may have various shapes and sizes. Accordingly, hollow gaskets may be extruded onto a forming surface parallel to the surface and in varying shapes supported by an extrusion anvil (676).

Figure 7:
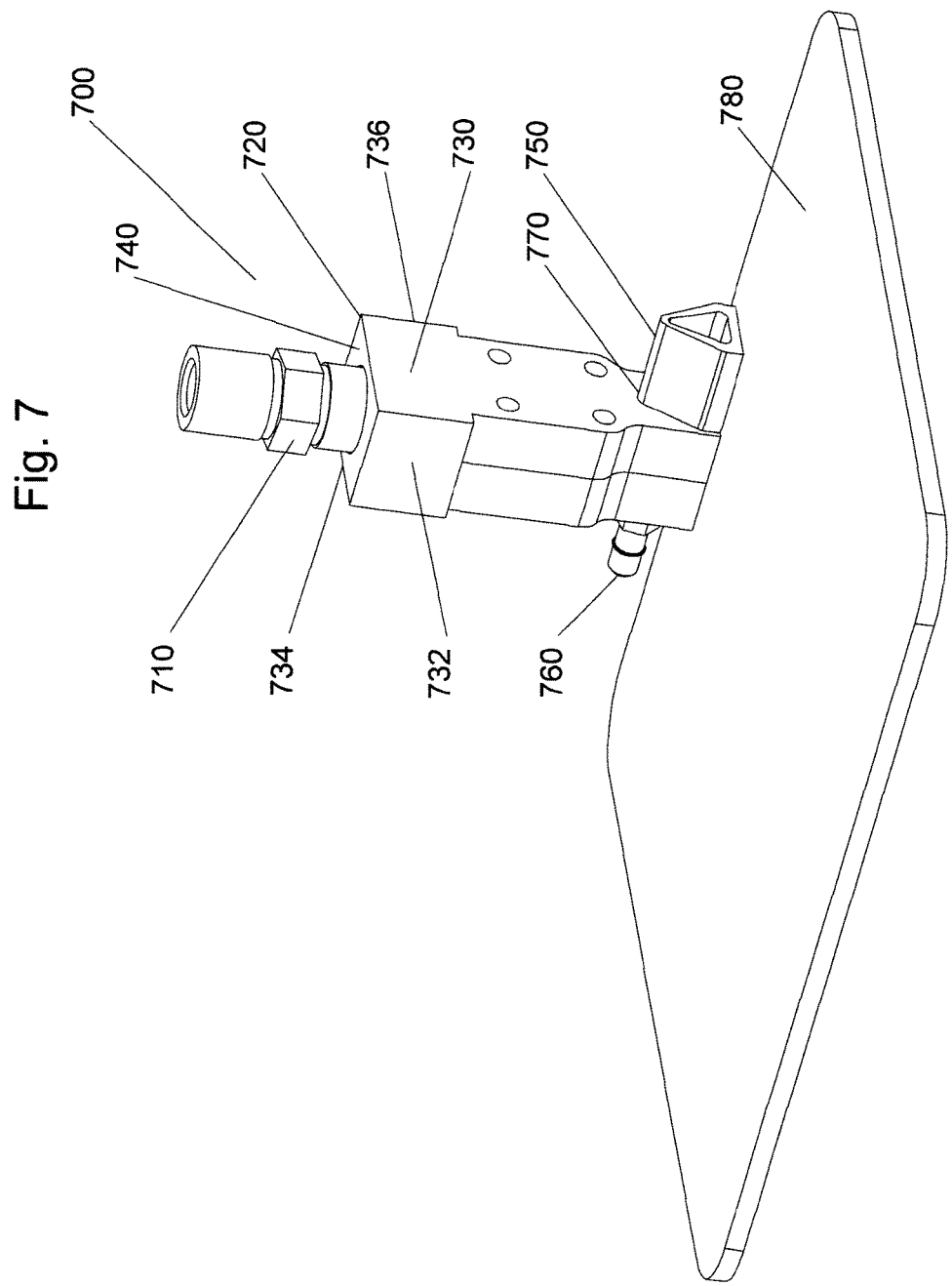
FIG. 7 illustrates a perspective view of an embodiment of a parallel extruding nozzle.

FIG. 7 illustrates a perspective view of an embodiment of a parallel extruding nozzle (700). In an exemplary embodiment, a connection means (710) connects a nozzle head (720) to an elastomer supply means (not shown). In an exemplary embodiment, for example, the nozzle head (720) may comprise a first side (730), a second side (732), a third side (734), a fourth side (736), a top side (740) and a bottom side (not shown). In a further embodiment, for example, the first side (730) may be parallel and planar to the third side (734), and perpendicular and planar to the second and fourth sides, (732) and (736), respectively. Similarly, the second side (732) may be parallel and planar to the fourth side (736), and perpendicular and planar to the first and third sides (730) and (734), respectively. Further, in an exemplary embodiment, the top side (740) may be parallel and planar to the bottom side (not shown). In a further exemplary embodiment, for example, a regulated air pressure connection means (760) may communicate with the third side (734). Those of ordinary skill in the art would understand, however, that the location of the regulated air pressure connection means (760) in view of the nozzle head (720) is exemplary only and that the regulated air pressure connection means (760) in accordance with the present disclosure may have alternate positions. These examples of a nozzle head configuration are non-limiting and the present disclosure contemplates a variety of nozzle head shapes and configurations. Accordingly, a nozzle head (720) communicates with a liquid elastomer supply means and a regulated air supply means.

In an exemplary embodiment, an extrusion orifice (770) comprises an inner channel (not shown) and an outer channel (not shown). In an exemplary embodiment, not meant to limit the present disclosure, for example, the extrusion orifice (770) may further comprise an extrusion anvil (not shown). In an exemplary embodiment, for example, the extrusion orifice (770) comprises a triangular shape. The nozzle head (720) extrudes a hollow gasket (750) onto a forming surface (780). In an exemplary embodiment of the present invention, for example, the nozzle head (720) may extrude a triangular-shaped, or other possible shaped, hollow gasket (750) onto the forming surface (780). Those of ordinary skill in the art would understand, however, that the shape of the extrusion orifice (770) and the shape of the resulting hollow gasket (750) are exemplary only, and that an extrusion orifice (770) and a gasket (750) in accordance with the present disclosure may have various shapes and sizes. Accordingly, a hollow gasket (750) may be extruded onto a forming surface (780) parallel to the surface (780) and in varying shapes.

Those of ordinary skill in the art would understand, however, that the present disclosure is not limited to such embodiments, as presented in FIGS. 4, 5, 6, and 7, but contemplates various extrusion orifice configurations, angles of extruding relative to the forming surface, and resulting gasket shapes.

A gasket may be formed in place by positioning a dispensing tip, or extrusion orifice, above a forming surface, and then moving the dispensing tip around the forming surface to produce a desired gasket path. The desired gasket path may be described using X axis, Y axis, or Z axis coordinates, and any combination thereof. Roll, pitch, and yaw are rotations about the X axis, Y axis, and Z axis, respectively. Those of ordinary skill in the art may refer to movement around the Z axis, or yaw, as theta. The X, Y, Z, and theta motion elements may work in concert to produce a vector of travel for the extrusion orifice. Acceleration, velocity, and position of the moving members may be adjusted to maintain synchronization between a vector travel rate of the orifice and a gasket extrusion rate. Various embodiments of the present disclosure may contemplate inclusion of a theta to direct the position of the extrusion orifice from a first position to a second position. The use of theta may maintain collinear stress lines of the gasket at the forming surface. In an exemplary embodiment, not meant to limit the present disclosure, a rotator may adjust theta, such that the extrusion orifice travels a desired dispense path. Accordingly, an extrusion orifice changes position in view of a theta motion element.

FIGS. 8 and 9 together illustrate an exemplary rotation of an extrusion orifice in accordance with various exemplary embodiments of the present invention. FIG. 8 illustrates an embodiment of a rotator of the present disclosure in a first position (800). In an exemplary embodiment, a material supply inlet (810) may provide material to a material supply control valve (820). The material supply control valve (820) may communicate with a rotator (830) through a first connection (840). In an exemplary embodiment, the first connection (840) comprises a high pressure connection. As a result, in an exemplary embodiment, the rotation of the rotator (830) may not influence the position of the material supply control valve (820). In other words, in an exemplary embodiment, not meant to limit the present disclosure, the position of the material supply control valve (820) may remain fixed relative to a position of a forming surface (870) regardless of the position of the rotator (830). Accordingly, a material supply control valve (820) may control the flow of liquid elastomer to the rotator (830), but the material supply control valve (820) does not rotate responsive to rotation of the rotator (830).

In various embodiments of the present disclosure, for example, the rotator (830) may communicate with a motor (850) by means of an interconnecting rotating belt (860). In an exemplary embodiment, not meant to limit the present disclosure, the motor (850) may identify a theta for rotation and maneuver, or rotate, the rotator (830) using the interconnecting belt (860) in view of the theta. In an exemplary embodiment, a second connection (880) may connect the rotator (830) to a nozzle head (890). In an exemplary embodiment not meant to limit the present disclosure, a regulated air supply means (892) communicates with a first side (894) of the nozzle head (890). In a further exemplary embodiment, the nozzle head (890) comprises an extrusion arm (896), which comprises an extrusion orifice (not shown). An arrow shows movement of the nozzle head (890) in a first position relative to the forming surface (870) as the nozzle head (890) dispenses a hollow gasket (898) in a first direction (812) onto the forming surface (870). Accordingly, a nozzle head (890) may extrude a hollow gasket (898) onto a forming surface (870) in a first direction.

FIG. 9 illustrates an embodiment of a rotator of the present disclosure in a second position (900). In an exemplary embodiment, a material supply inlet (910) may provide material to a material supply control valve (920). The material supply control valve (920) may communicate with a rotator (930) through a first connection (940). In an exemplary embodiment, the first connection (940) comprises a high pressure connection. As a result, in an exemplary embodiment, the rotation of the rotator (930) may not influence the position of the material supply control valve (920). In other words, in an exemplary embodiment, not meant to limit the present disclosure, the position of the material supply control valve (920) may remain fixed relative to a position of a forming surface (970) regardless of the position of the rotator (930). Accordingly, a material supply control valve (920) may control the flow of liquid elastomer to the rotator (930), but the material supply control valve (920) does not rotate responsive to rotation of the rotator (930).

In various embodiments of the present disclosure, for example, the rotator (930) may communicate with a motor (950) by means of an interconnecting rotating belt (960). In an exemplary embodiment, not meant to limit the present disclosure, the motor (950) may identify a theta for rotation and maneuver, or rotate, the rotator (930) using the interconnecting belt (960) in view of the theta. In an exemplary embodiment, a second connection (980) may connect the rotator (930) to a nozzle head (990). In an exemplary embodiment not meant to limit the present disclosure, a regulated air supply means (992) communicates with a first side (994) of the nozzle head (990). In a further exemplary embodiment, the nozzle head (990) comprises an extrusion arm (996), which comprises an extrusion orifice (not shown). An arrow shows movement of the nozzle head (990) in a second position relative to the forming surface (970) as the nozzle head (990) dispenses a hollow gasket (998) in a second direction (912) onto the forming surface (970). In an exemplary embodiment, for example, the nozzle head accommodates turning on the forming surface (970). In an exemplary embodiment, for example, the inclusion of a rotator (930) responsive to theta (932) may allow the hollow gasket (998) to maintain an orientation parallel to a vector of travel. In doing so, for example, the rotated nozzle head (990) may minimize torsion forces that would otherwise accompany a change in direction. As it would be best understood by those of ordinary skill in the art, the torsion forces may be moved to the inside edge, or in the hollow cavity of the hollow gasket (998), before final gasket formation. As a result, for example, the torsion forces have no effect on the hollow gasket (998) formation. Accordingly, as shown by example in FIGS. 8 and 9, a rotator, (830) and (930), rotates a nozzle head, (890) and (990), from a first position to a second position, and the nozzle head, (890) and (990), changes dispensing onto the forming surface (870) and (970), from a first direction to a second direction.

It is to be understood that the various embodiments shown and described herein are to be taken as exemplary. Elements and materials, and arrangements of those elements and materials, may be substituted for those illustrated and described herein, parts may be reversed, and certain features of the present disclosure may be utilized independently, all as would be apparent to one skilled in the art after having the benefit of the description herein. Changes may be made in the elements described herein without departing from the spirit and scope of the present disclosure and following claims, including their equivalents.

It is to be understood that the particular embodiments set forth herein are non-limiting, and modifications to structure, dimensions, materials, and methodologies may be made without departing from the scope of the present disclosure.

It is to be further understood that this description's terminology is not intended to limit the invention. For example, spatially relative terms, such as "front," "back," "top," "bottom," "side," and the like, may be used to describe one element's or feature's relationship to another element or feature as intended to connote the orientation of, for example, the extrusion head as illustrated in the figures.

For the purposes of this specification and appended claims, unless otherwise indicated, all numbers expressing quantities, percentages or proportions, and other numerical values used in the specification and claims, are to be understood as being modified in all instance by the term "about" if they are not already. That is, unless indicated to the contrary, the numerical parameters set forth in the specification and claims are approximations that may vary depending on the desired properties sought to be obtained by the present disclosure.

What is claimed is:

1. An apparatus for making a hollow, form-in-place gasket, the apparatus comprising:
   a nozzle comprising an extrusion orifice;
   the nozzle in communication with an air supply unit and a liquid elastomer supply unit, wherein the nozzle maintains separation between supplied air and supplied liquid elastomer proximate to the extrusion orifice;

wherein the nozzle comprises an inner channel in communication with the air supply unit and an outer channel in communication with the liquid elastomer supply unit;

wherein the air supply unit comprises a first valve in communication with the inner channel, wherein the first valve controls air flow to the inner channel;

wherein the air supply unit further comprises a second valve in communication with the inner channel, wherein the first valve controls low pressure air flow to the inner channel and the second valve controls high pressure air flow to the inner channel; and a forming surface.

2. The apparatus of claim 1, wherein the inner and outer channels are in substantially collinear communication.

3. The apparatus of claim 1, further comprising a restrictor unit in communication with the first valve and the inner channel.

4. The apparatus of claim 1, wherein the extrusion orifice has an orientation relative to the forming surface selected from the group consisting of orthogonal and parallel.

5. The apparatus of claim 1, further comprising a rotator unit operatively connected to the extrusion orifice, wherein the rotator unit rotates the extrusion orifice from a first position to a second position.

\* \* \* \* \*